United States Patent [19]

Becker

[11] Patent Number: 5,090,711
[45] Date of Patent: Feb. 25, 1992

[54] SEAL ASSEMBLIES FOR INTERNAL MIXERS

[75] Inventor: Anton Becker, Stow, Ohio

[73] Assignee: Americhem, Inc., Cuyahoga Falls, Ohio

[21] Appl. No.: 486,148

[22] Filed: Feb. 28, 1990

Related U.S. Application Data

[63] Continuation-in-part of Ser. No. 233,593, Aug. 18, 1988, Pat. No. 5,056,800.

[51] Int. Cl.$^5$ .............................................. F16J 15/34
[52] U.S. Cl. ......................................... 277/68; 277/3; 277/82; 277/134
[58] Field of Search .................... 277/1, 3, 38, 53, 54, 277/67-72 FM, 81 R, 82, 83, 88-91, 92, 93 R, 935 D, 97-100, 133-135

[56] References Cited

U.S. PATENT DOCUMENTS

| 450,004 | 7/1891 | Daley . | |
|---|---|---|---|
| 1,926,006 | 9/1933 | Kohler | 277/93 |
| 2,721,747 | 12/1951 | Whitfield . | |
| 3,131,942 | 7/1959 | Ertaud . | |
| 3,188,095 | 6/1965 | Van Vleet | 277/83 X |
| 3,363,910 | 1/1968 | Toronchuk | 277/91 X |
| 3,364,523 | 5/1966 | Schippers . | |
| 3,700,247 | 10/1972 | Butler et al. . | |
| 3,746,349 | 7/1973 | Smale et al. . | |
| 3,749,412 | 7/1973 | Lingley | 277/81 R |
| 3,963,247 | 6/1976 | Nommensen | 277/67 X |
| 3,968,969 | 7/1976 | Mayer et al. . | |
| 4,103,904 | 8/1978 | Tankus | 277/93 R X |
| 4,509,773 | 4/1985 | Wentworth . | |
| 4,521,026 | 6/1985 | Eide | 277/134 |
| 4,558,873 | 12/1985 | Berthiaume | 277/935 D X |
| 4,575,306 | 3/1986 | Monnot . | |
| 4,790,736 | 12/1988 | Keuchel . | |
| 4,801,244 | 1/1989 | Stahl . | |

FOREIGN PATENT DOCUMENTS

| 1348765 | 2/1963 | France | 271/134 |
|---|---|---|---|
| 100076 | 7/1959 | Netherlands . | |
| 102558 | 7/1959 | Netherlands . | |
| 397362 | 8/1965 | Switzerland . | |
| 883188 | 2/1959 | United Kingdom . | |
| 1270762 | 3/1970 | United Kingdom . | |

Primary Examiner—William A. Cuchlinski, Jr.
Assistant Examiner—Scott W. Cummings
Attorney, Agent, or Firm—Renner, Kenner, Greive, Bobak, Taylor & Weber

[57] ABSTRACT

A seal assembly for the rotor shafts of internal mixers and the like used in the compounding of rubber and plastic. The assembly (130,170) comprises seal rotor means (130,170) carried by said rotor shaft outside of the mixing chamber of said mixer and having a continuous circumferential region (136,175) for the bi-directional movement of a viscous melt of flowable material which provides first trough means (138,176) extending axially away from the housing, second trough means (139,178) extending axially toward the housing, and annular groove means (140,179) between the first and second trough means; sleeve means (132,172) non-rotatably carried by the housing of the mixer concentrically disposed about the seal rotor means; retainer ring means (134,173) rotatable with the rotor shaft and engageable with the rotor means; and locking ring means (135,174) rotatable with the rotor shaft and providing adjustable means (154,190) for maintaining the retainer ring means in communication with the seal rotor means, wherein movement of the flowable material between the continous circumferential region and the sleeve means forms a dynamic melt seal thereby controlling the discharge of materials from the mixing chamber between the housing and the rotor shaft.

7 Claims, 7 Drawing Sheets

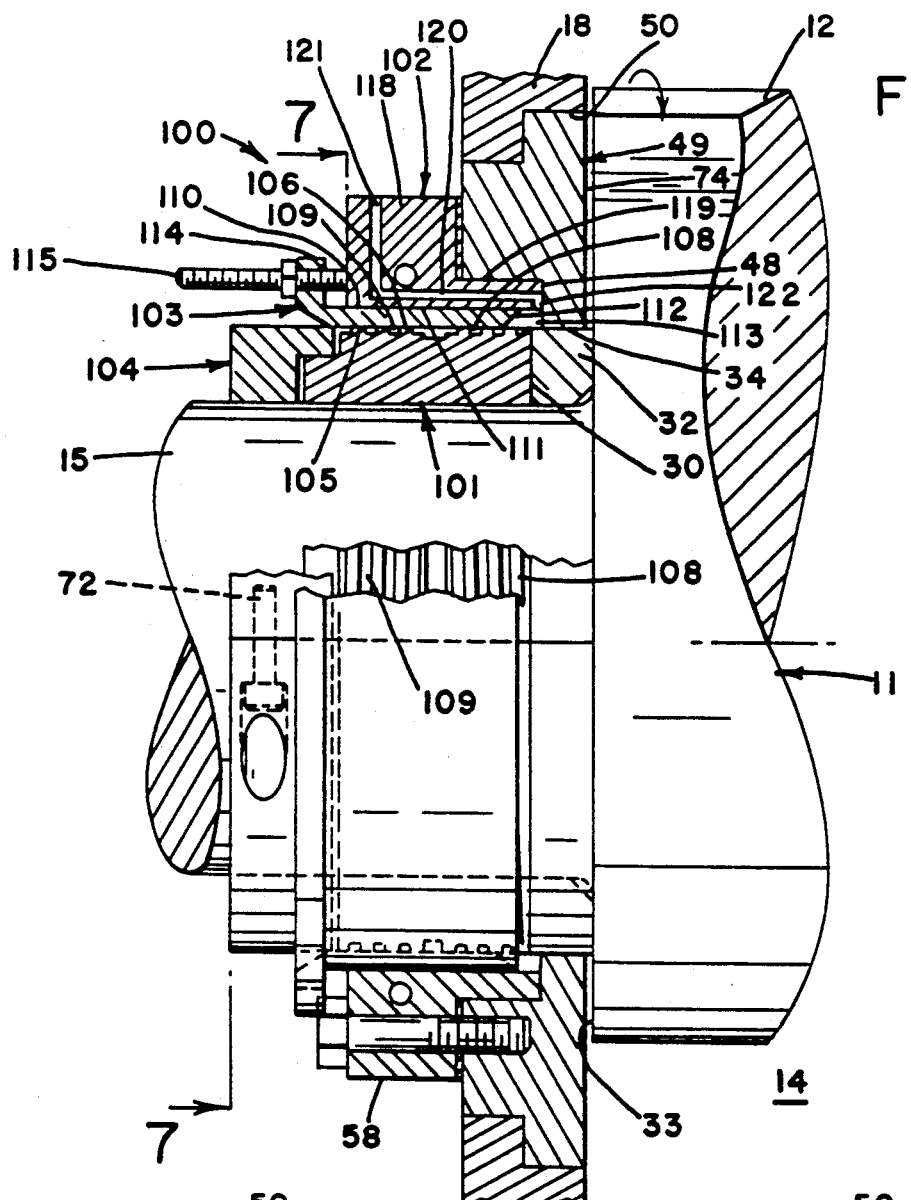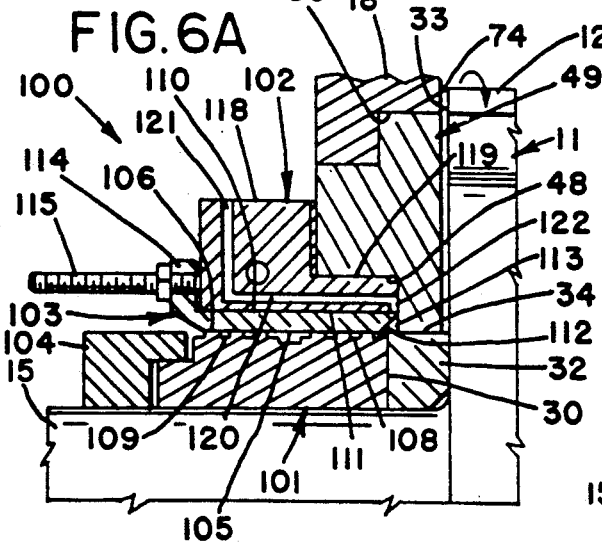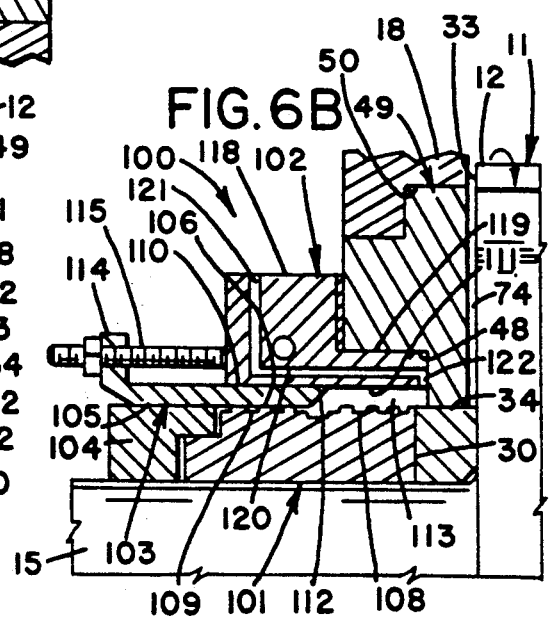

SEAL ASSEMBLIES FOR INTERNAL MIXERS

CROSS-REFERENCE TO RELATED APPLICATIONS

This application is a continuation-in-part of U.S. Ser. No. 233,593, filed Aug. 18, 1988, now U.S. Pat. No. 5,056,800.

TECHNICAL FIELD

High intensity internal mixers, of which the Banbury type is an example, are used in the rubber and plastic industry to soften, melt, mix and/or dispense components and additives during the compounding of various formulations. Due to the action and design of the mixer rotors and the application of pressure by the air loaded ram, the contents of the mixing chamber tend to leak between the rotor shafts and the mixer chamber. While this is a minor problem for the compounding of rubber, when plastics are compounded the materials are more costly and their loss is a significant problem.

Numerous attempts have been made to design seals that contain the material, provide a reasonable service life, have a low manufacturing cost and are preferably quickly and easily changed. The present invention provides an apparatus and method to create a dynamic melt seal, or viscous O-ring for use with rotors of internal mixers.

BACKGROUND OF THE INVENTION

As noted above, a variety of seals have been designed for internal mixers. The packing type of seal is one example and it employs an adjustable packing gland and a shaft seal comprising a wear ring of glass filled Teflon. A shortcoming of this design is the necessity of constant adjustment of the packing gland in order to make up for wear. The gland pressure causes increased friction on the rotor shaft which requires higher driving torque and causes shaft wear.

Another design comprises the face type seals. One version is spring loaded in which the application of the spring load generates pressure on the sealing face which contacts the shaft. As the internal pressure increases, more spring force is required which generates higher friction and heat. This heat, in turn, causes faster seal face deterioration, specifically if polymer seal materials are used. As the seal face wears, the spring force on the seal surface diminishes which allows more compound to leak. When processed compounds are very abrasive, as is true for halogenated thermoplastics and abrasive additives, accelerated wear and seal failures result.

As a variation, some face type seals are loaded with hydraulic or pneumatic cylinders to compensate for wear of the sealing surface. The pressure or load remains constant, it does not decrease with wear as spring loaded seals. In some seal designs, external lubrication is incorporated to reduce friction and wear between the rotating and stationary seal faces.

Several problems that limit the use of this type of seal include lubricant flow into the mixer cavity and leaks from the seal area which contaminate the surrounding area necessitating frequent clean-up. Also, the seal lubricant selected must be compatible with the material being processed. In some instances, operating temperatures may cause degradation of the lubricant. Lastly, some polymeric seal faces contain molybdenum disulfate, graphite or other lubricants and operate without external lubrication. Friction generated temperature causes softening of this seal type which results in deformation under sealing pressure and accelerated wear.

A third variation of the face type seals is the reverse action seal in which the sealing force is generated by the internal pressure of the mixer. The escaping material generates a pressure against a rotating sealing ring which is allowed to float in the axial direction and generate a sealing pressure on the opposing seal higher than the mixer pressure. This type of seal does not require external adjustment or loading to function, but has the same problem as the other face type seals.

Another type of seal is the close clearance, temperature controlled seal. This seal is not externally lubricated and it is applicable to nonabrasive, self-lubricating materials such as polyolefins and the like. The sealing is achieved by temperature control of the gland to solidify the polymer which generates its own seal. The major problem with this type of seal is that only a limited range of materials can be processed. Abrasive additives or corrosive materials wear the gland and shaft rapidly and the increased clearance causes the seal to leak.

Another type is the pumping screw or forwarding screw seal. Seals of this design are utilized in various applications and employ on the rotor shaft spiral grooves which generate a forwarding force and pump the polymer toward the inside of the mixer. The problem associated with this design is that when internal pressure of the mixer decreases below the pumping pressure of the seal spiral, dislodged material is pumped back into the main melt.

Finally, the labyrinth type seal employs an array of concentric grooves in the rotor or in the stationary part with close clearance to provide the sealing function. The principle of this seal arrangement is that leaking material must flow across a closed clearance dam into the adjacent groove. If sufficient stages of labyrinth grooves are provided, material leak could be eliminated or a controlled leak could result. Problems are also associated with this type of seal. First, due to deflection of the rotor shafts, clearances must be relatively large resulting in considerable leak flow which, in turn, necessitates long labyrinth seal. Second, grooves may become filled with solid or degraded material rendering the seals ineffective.

Thus, despite the widespread existence of Banbury and other types of high intensity internal mixers for more than 50 years and the many and varied designs for seals, a structure has not been provided heretofore that is effective in sealing the rotors, particularly in environments that are abrasive or corrosive or both such as the compounding of certain thermoplastic formulations.

SUMMARY OF THE INVENTION

It is therefore an object of the present invention to provide a seal assembly that is useful for providing a seal for the rotors of high intensity internal mixers.

It is another object of the present invention to provide a seal assembly that creates a dynamic, viscous O-ring from the material within the mixer.

It is another object of the present invention to provide a seal assembly that can accommodate rotor shaft deflections, has a long service life, a reasonable manufacturing cost and is relatively easy to install and maintain.

It is yet another object of the present invention to provide a seal assembly that permits changes of material and/or the color of the material to be made without the necessity of cleaning the seal as is required in existing apparatus.

It is another object of the present invention to provide a method for creating a dynamic, viscous O-ring seal for rotors that is effective with the compounding of thermoplastic polymers.

It is another object of the present invention to provide a method for creating a dynamic, viscous O-ring seal that minimizes the loss of compounds, including powdered materials, and which does not permit escaping material to flow back into the mixing chamber.

These and other objects, together with the advantages thereof over known seal designs and related methods, which shall become apparent from the specification which follows, are accomplished by the invention as hereinafter described and claimed.

In general, a seal assembly for the rotor shafts of internal mixers and the like comprises seal rotor means carried by the rotor shaft outside of the mixing chamber of the mixer and having a continuous circumferential region for the bi-directional movement of a viscous melt of flowable material which provides first trough means extending axially away from the housing, second trough means extending axially toward the housing, and annular groove means between the first and second trough means; sleeve means non-rotatably carried by the housing of the mixer concentrically disposed about the seal rotor means; retainer ring means rotatable with the rotor shaft and engageable with the rotor means; and locking ring means rotatable with the rotor shaft and providing adjustable means for maintaining the retainer ring means in communication with the seal rotor means, wherein movement of the flowable material between the continuous circumferential region and the sleeve means forms a dynamic melt seal thereby controlling the discharge of materials from the mixing chamber between the housing and the rotor shaft.

BRIEF DESCRIPTION OF THE DRAWINGS

FIG. 5 is a partial side elevation, partially in section, depicting an alternate embodiment of the present invention;

FIGS. 6A and 6B depict sequentially stages of operation of the balancing element of FIG. 5;

PREFERRED EMBODIMENT FOR CARRYING OUT THE INVENTION

The present invention provides a seal assembly for the rotors of high intensity internal mixers which are particularly useful in instances where plastic formulations are being compounded. Such mixers are well known and include a mixing chamber and one or more rotors which are provided with blades that operate to work the mixture of rubber or plastic against the surface of a surrounding mixing chamber as well as between blades in multiple rotor apparatus. The action of the blades performs a kneading action on rubbery and plastic materials and works into the material the various other components that are desired in the mixture.

Typically, during the mixing operation, a small portion of the material is driven between the rotors and housing that forms the internal chamber and out of the apparatus. In order to minimize this action, seals are employed to control movement between the housing and the rotors. These are customarily lubricated to decrease friction and wear and occasionally the lubricant works its way into the mixing chamber. When rubber is being compounded, the loss of material is not a serious problem, nor is the entry of seal lubricant into the mixing chamber a problem, particularly where the rubber formulation contains oil.

For the compounding of plastics, most lubricants would contaminate the mixture and, therefore, it is customary to select a compatible material such as dioctyl phthalate, which is a plasticizer for many formulations, but not an inexpensive remedy. Another problem is the loss of components from the mixer. Such losses are not readily quantifiable which gives rise to variations in the formulation and, many of the ingredients lost are rather expensive which, in turn, increases the cost of the plastic resin being compounded.

Still another difficulty unique to plastic compounding is that some formulations, particularly those containing halogenated polymers, are corrosive to the seals. Most plastic formulations are also sensitive to heat and if allowed to become entrapped in the seal areas they scorch and form hard particles. These particles are not only abrasive to the seal and surrounding components, but if they are worked back into the mixing chamber, they will eventually form an imperfection in the plastic article manufactured from the resin.

Because these problems exist with all known internal mixers, the seal assembly and related method of the present invention can be employed in substantially any design of apparatus and thus, practice of the present invention is not to be limited to any specific type of mixer, such as a Banbury, or size of mixer. Similarly, while the problems attendant the compounding and mixing of plastics are particularly hard on seals, practice of the present invention is not limited to embodiments where plastics are compounded, but also includes rubber compounding as well as other materials.

Figure 1:
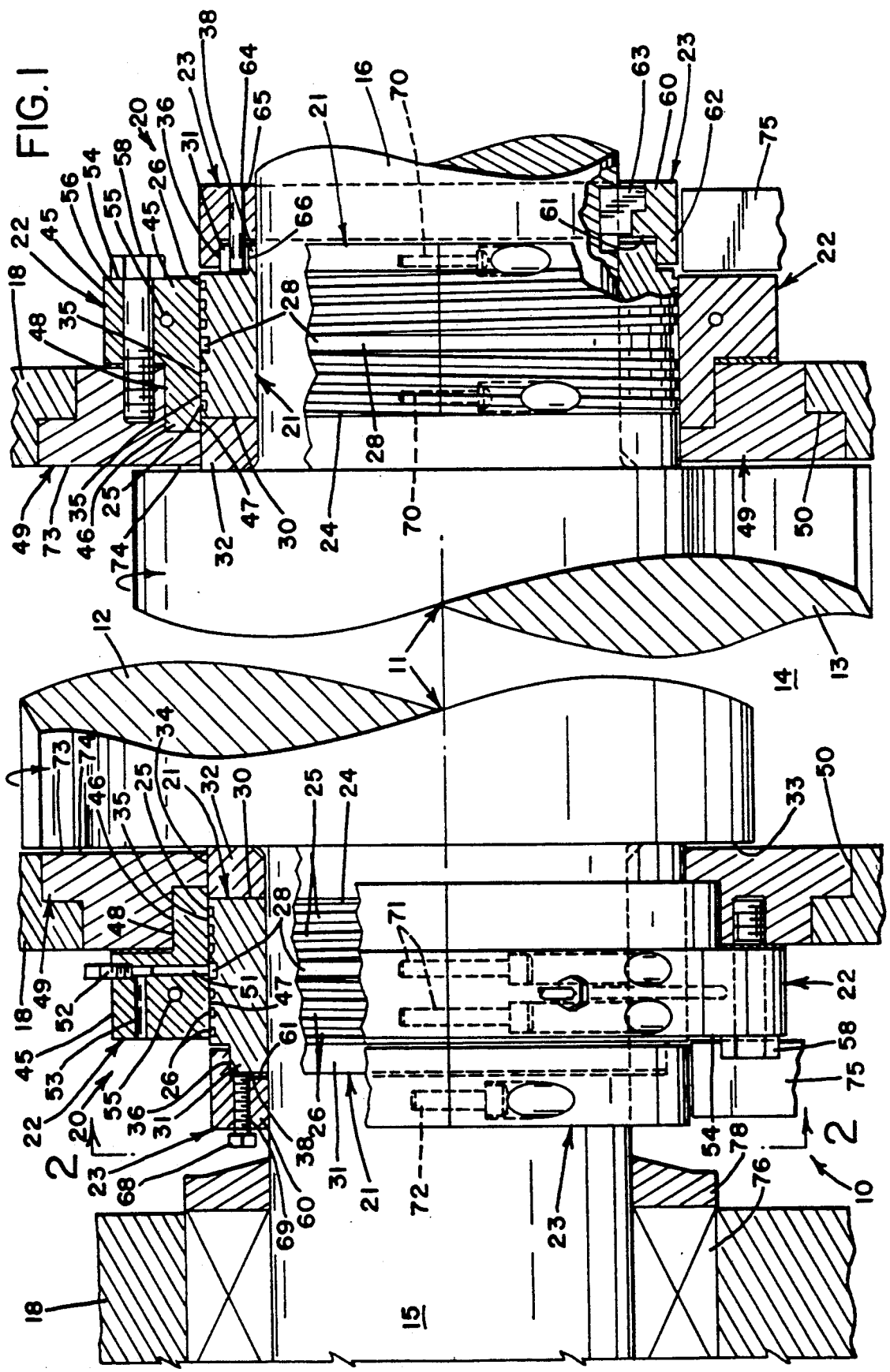
FIG. 1 is a side elevation, partially in section, depicting the seal assembly of the present invention in conjunction with one rotor of an internal mixer.
Figure 2:
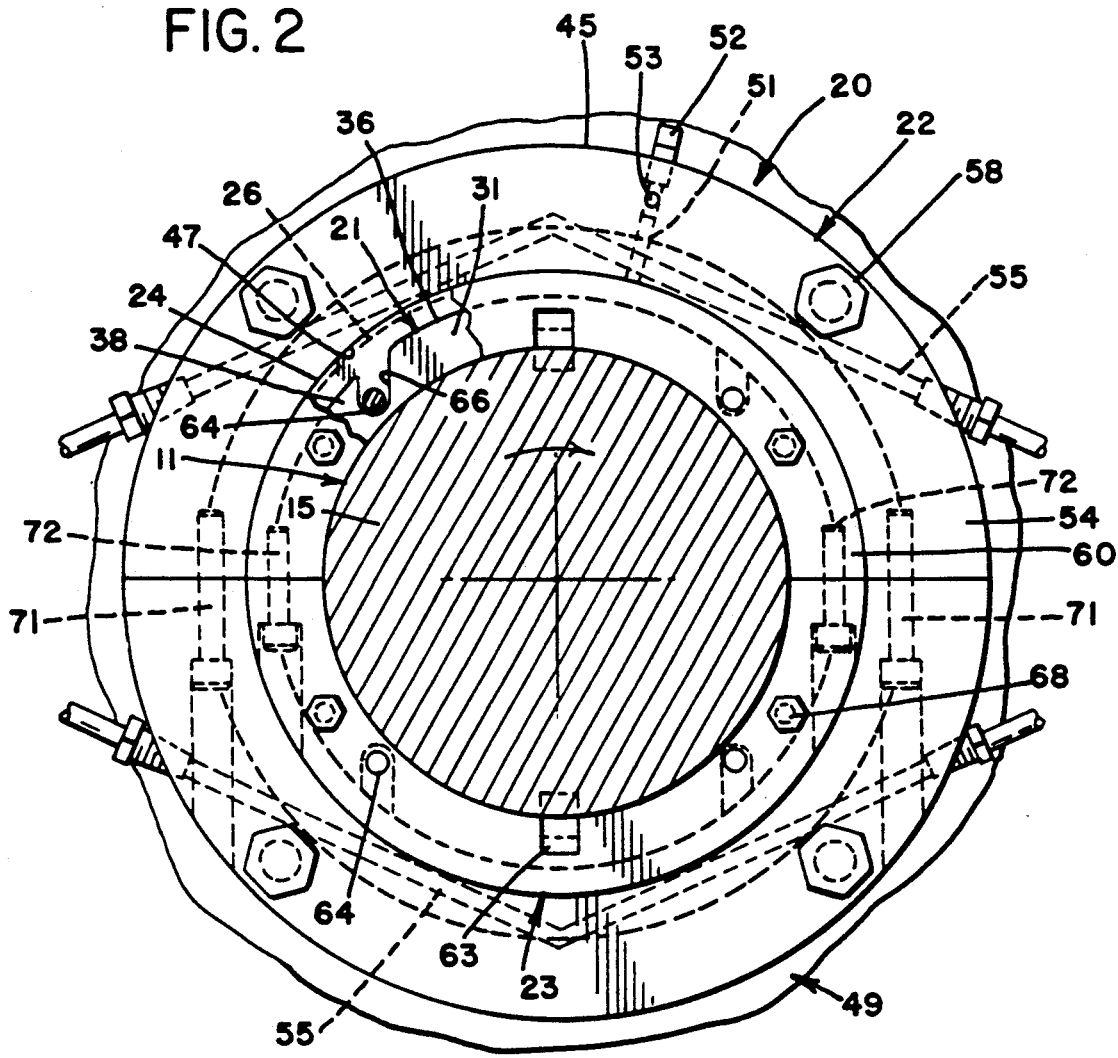
FIG. 2 is a cross-section taken substantially along the line 2—2 of FIG. 1.

With respect now to the drawings, the internal portion of a typical mixer 10 is depicted in FIG. 1. The mixer 10 is shown with a single rotor 11, having blades 12 and 13 which are contained within a mixing chamber 14. The rotor 11 and chamber 14 have been partially broken away and, therefore, the interrelation of the blades with the matingly configured troughs of the chamber 14 has not been depicted. The rotor 11 provides left and right axial shafts, 15 and 16 respectively, which pass through the housing walls of the mixer 10, indicated by the numeral 18.

The seal assembly of the present invention is indicated generally by the numeral 20. It is to be appreciated that one seal assembly 20 is provided in conjunction with the shafts 15 and 16 at each side of the mixer 10 and that the description of one is applicable to both. The seal assembly includes three elements: seal rotor means 21; sleeve means 22 and retainer ring means 23.

In greater detail, the seal rotor 21 fits concentrically about the shaft 15 and carries a continuous circumferential portion, indicated generally by the numeral 24. Moving outwardly from the chamber 14, circumferential region 24 provides an inner or first set of spiral troughs 25, which extend axially away from the housing in the manner of a right hand thread. An outer or second set of spiral troughs 26 from the circumferential portion 24 extend axially toward the chamber in the manner of a left hand thread. Where first and second troughs 25 and 26 meet, an annular groove 28 may be provided which is deeper and wider than the troughs 25 and 26 provided by the circumferential region 24.

The seal rotor 21 terminates at its forward end with a face 30 and at the trailing end with an outer flange 31. A wear ring 32 is interposed between rotor face 30 and the shoulder 33 formed by the rotor blades 12 and 13 and provides an outer, cylindrical wall 34 of the same diameter as the lands 35 of troughs 25. The wall 34 is contiguous with the leading edge of troughs 25 and 26. Outer flange 31, at the other end of seal rotor 21, is likewise contiguous with the trailing edge of troughs 26. It has an outer cylindrical wall 36 of a lesser diameter than the wall 34 of ring 32 and terminates with an exterior face 38.

While wear ring 32 is depicted in the drawings, it is not a necessary element of the seal assembly 20 but is instead an element often present in mixing apparatus. Where the ring 32 is not employed, it is within the scope of the present invention to abut seal rotor face 30 against the shoulder 33 in which instance the spiral troughs 25 may begin adjacent face 30 or a short axial distance therefrom.

The seal rotor 21 carried by shaft 16 is the mirror image of the seal rotor carried by shaft 15 and thus provides a circumferential portion with continuous inner or first spiral troughs 25 of left hand orientation and outer or spiral troughs 26 of right hand orientation with an annular groove 28 therebetween. The purpose for the opposite hand of the troughs will be explained herebelow. The remaining elements of the seal rotor carried by shaft 16 are identical to those carried by shaft 15 and shall therefore not be repeated.

The sleeve means 22, comprises an L-shaped cylindrical member having a central body portion 45 and an inwardly extending leg 46. Both body portion 45 and leg 46 form a continuous cylindrical inner wall or sleeve 47 which is contiguous with the lands 35 of inner and outer troughs 25 and 26, respectively. Sleeve 47 is coaxial with the inner troughs 25 and the outer troughs 26. The leg 46 fits within a notch 48 provided in wear plate 49 which is provided in a suitable recess 50 in housing member 18. Wear plate 49, or the equivalent structure, is customarily provided by the manufacturer of the mixer 10 and as such, does not constitute an element of the seal assembly 20. Nevertheless, in order to obtain contact between the sleeve 47 and circumferential portion 24, the notch 48 must be provided.

A radial port 51 is provided through the body portion 45 in alignment with the annular groove 28 of seal rotor 21. It can be capped with a valve 52 or similar device and an axial port 53 may be optionally channeled through the rear wall 54 of body 45 into radial port 51. The purpose and use of ports 51 and 53 shall be explained hereinbelow. A plurality of chord segment channels 55 are also provided in sleeve means 22 for the circulation of cooling medium or heating medium, as necessary, to control movement of viscous melt material passing between seal rotor 21 and sleeve means 22 as will also be described hereinbelow. Finally, a plurality of axial bores 56 are provided through the body 45 for the receipt of bolts 58 which affix sleeve means 22 to wear plate 49 so that sleeve means 22 is non-rotatably held by the housing 18.

Retainer ring means 23 comprises a cylindrical flange which also fits upon the shafts 15 and 16. Retainer ring 23 provides a body portion 60, the inner wall of which 61 is adjacent end wall 38 of outer flange 31, and an axially extending leg 62 which overlaps and matingly engages the outer cylindrical wall 36 of outer flange 31. Retainer ring 23 is affixed to the shaft 15 with key 63 and is rotatable therewith.

A plurality of shear pins 64 are driven into bores 65 and 66 in retainer ring 23 and seal rotor means 22, respectively so that the latter is rotatable with the former and the shaft 15. One or more jack screws 68 are threadably engaged in an axial bore 69 provided in the body 60 of retainer ring 23. The end of jack screw 68 engages the face 38 of outer flange 31 and maintain the wear ring 32 firmly against the shoulder 33 of the rotor 11.

Figure 4:
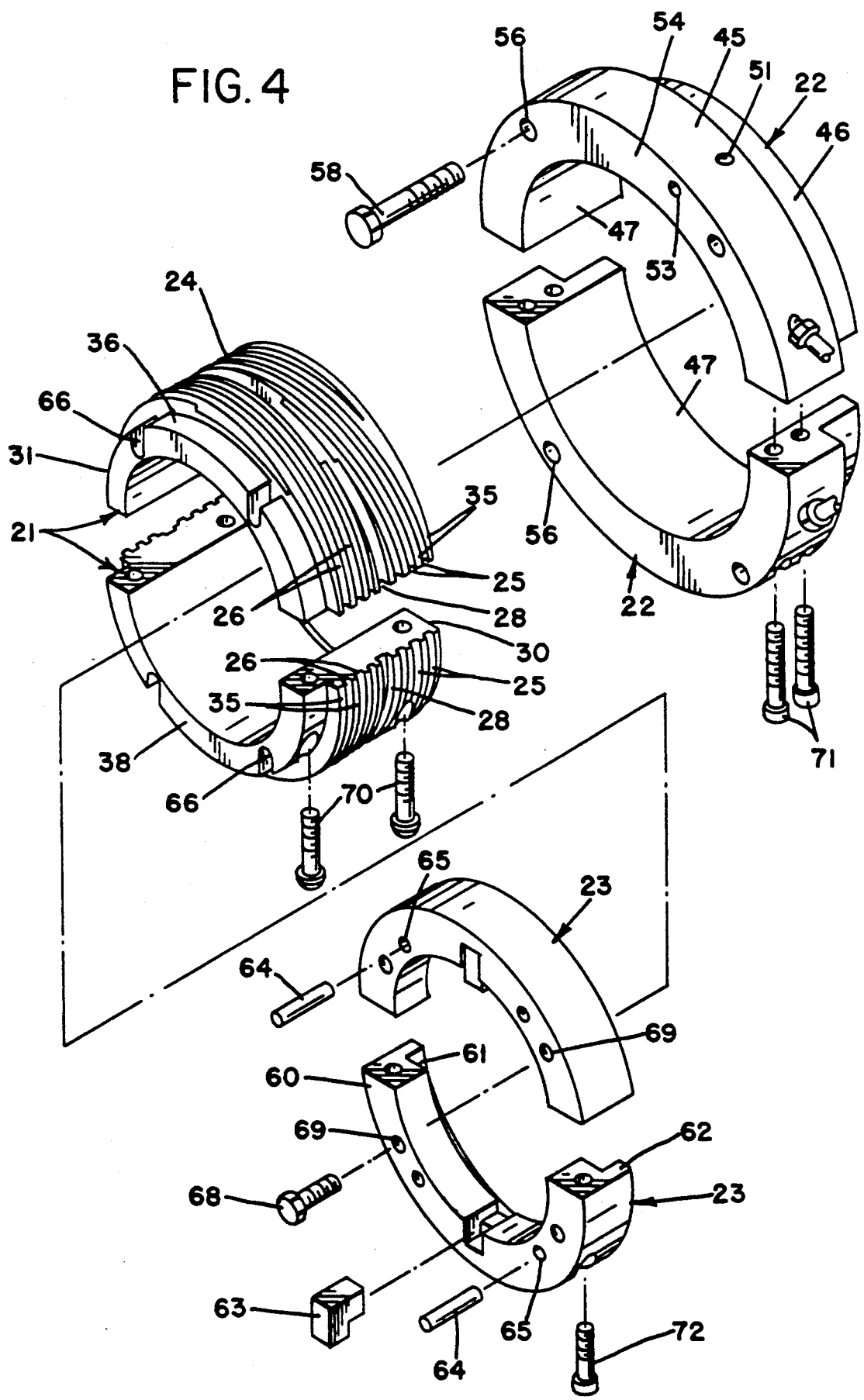
FIG. 4 is an exploded perspective depicting the seal rotor, seal means and retainer means of the present invention.
Figure 7:
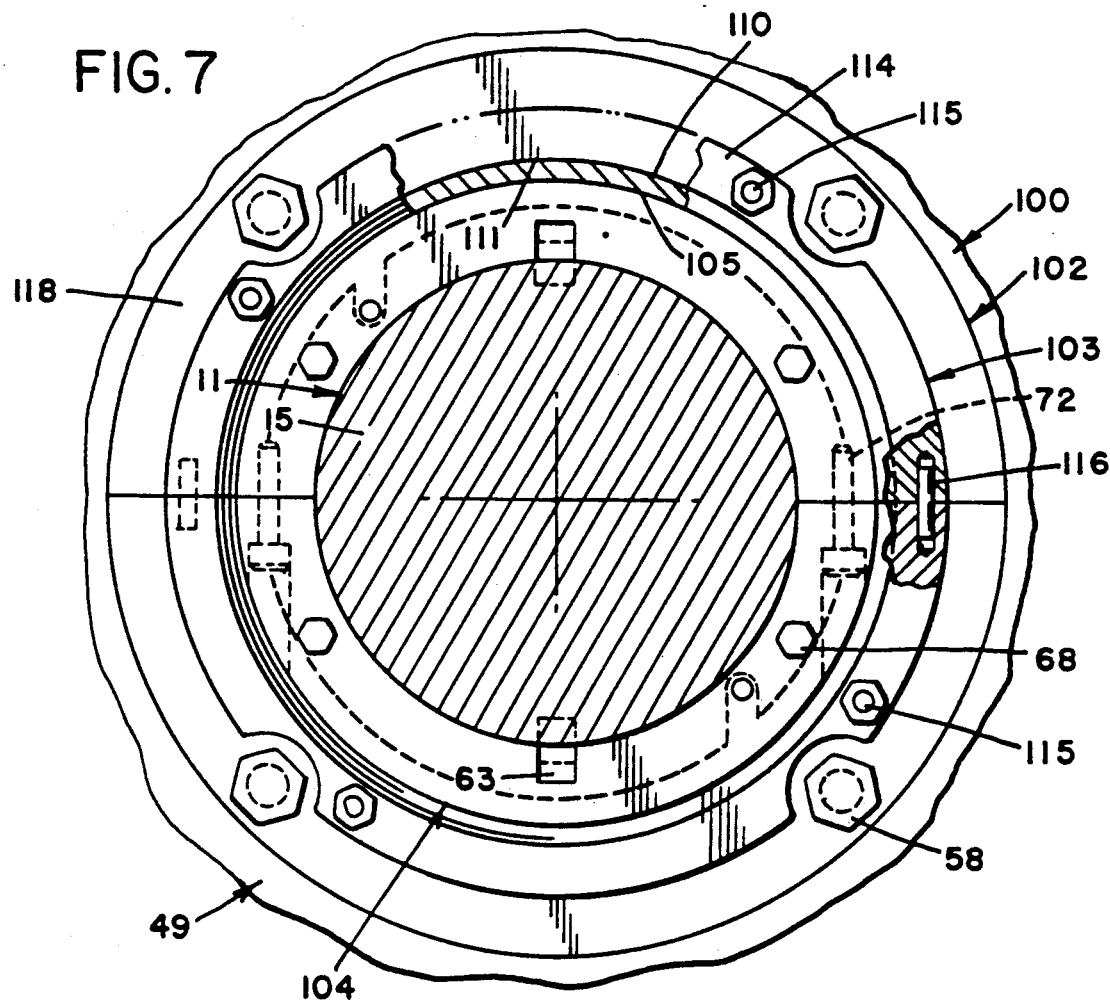
FIG. 7 is a cross-section taken substantially along line 7—7 of FIG. 5.

In order to install the seal assembly, the seal rotor 21, sleeve means 22 and retainer ring 23 are each manufactured in halves, as depicted in FIG. 4. The halves of seal rotor 21 are positioned around a shaft 15 and then fastened together with bolts 70. In similar fashion, the halves of retainer ring 23 are also positioned around shaft 15 behind seal rotor 21 and fastened together with bolts 71. Finally, the halves of sleeve means 22 are positioned within the housing 18 and fastened together with bolts 72. Shear pins 64 are positioned and jack screw 68 adjusted, as described above, and the assembly is ready for operation.

Having thus described the basic component elements of seal assembly 20, the operation thereof to form a dynamic melt seal, and practice of the method of the present invention shall be next provided.

Figure 3:
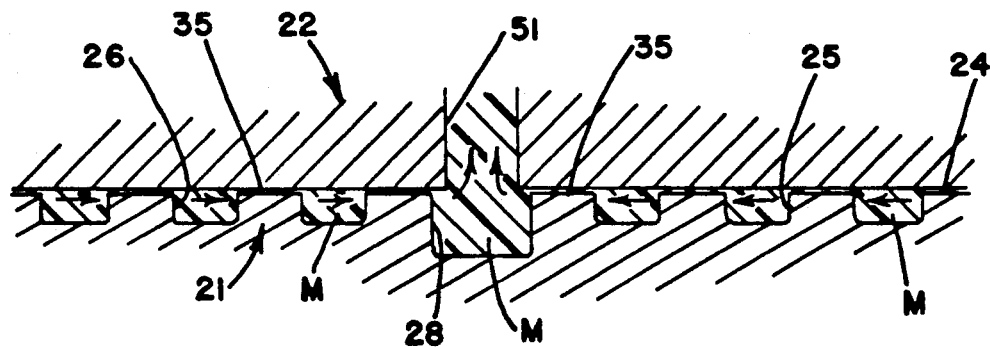
FIG. 3 is an enlarged cross-sectional view depicting the adjacent surfaces between the seal rotor and sleeve means of the seal assembly.

During mixing of the materials within the internal chamber 14, small quantities will eventually be worked out between the shoulders 33 of rotor blades 12 and 13 and the leading edge 73 of wear plates 49. From the space 74 therebetween, the material passes along the inner spiral troughs 25 until each is filled and continues to move away from the housing until it collects in the annular groove 28. Continued drive or movement of material from the chamber 14 will eventually exceed the capacity of annular groove 28 in which instance the material enters the outer spiral troughs 26. Because the orientation of these troughs is opposite that of the troughs 25, the material is moved axially back toward the housing and is thereby simultaneously returned to the annular groove 28. The troughs 25 and 26, in effect, provide an opposed pumping action, as depicted in FIG. 3, which pressurizes the material M within the annular groove to form a fluid, dynamic O-ring and stop further material leakage. It is to be appreciated that the orientation of the inner and outer spiral troughs must be opposite each other and that the directions are dependent upon the direction of rotation of the rotor 11. In this manner, the desired pumping action toward the annular groove 28 is achieved.

It should be appreciated that whether the material being compounded is rubber or plastic, it will behave as a putty-like or dough-like semi-solid. Also, as the temperature of the mixture rises during mixing, the material becomes more flowable, generating a viscous melt. While this has a tendency to increase the likelihood the material will be driven out of the chamber, it also insures that a continuous supply of material is driven to the groove 28 thereby providing a dynamic O-ring which is very effective in the sealing the chamber against further discharge of material.

Should any material pass totally beyond the second, outer spiral troughs 26, scraper blades 75 can be positioned behind sleeve means 22 to effect removal by a scraping movement before the material can reach the thrust bearing 76 (depicted schematically) conventionally carried on the shafts 15 and 16 beyond the seal assemblies 20. Also, a dust deflector 78 can be provided before the bearings, as is known.

With respect again to FIG. 1, the radial port 51 provided in sleeve means 22 can be employed as a drain channel which is utilized for controlled bleeding of the annular ring 28 when materials are compounded that rapidly degrade. Operation of the valve 52 will vary the volume of material that is bled. Another useful feature of the radial port 51 is that by maintaining a controlled bleed of material through the annular groove 28, there is no chance for any residue to build up, scorch and then return back into the chamber 14.

In the event a build-up of stagnant material does occur, particularly during periods of nonoperation, the axial port 53 can be utilized for the injection of molten or liquid purge material to solubilize any solid residue remaining in the port 51, groove 28 or even the troughs. Port 53 can also be utilized as an injection port for cleaning operation, thereby obviating disassembly of the seal assembly 20. Despite the presence of these features, there remains the possibility that an appreciable quantity of material may cool down and solidify in the seal assembly between periods of nonoperation. In such instances the functional engagement between the seal rotor 21 and sleeve means 22 is tremendous, such that subsequent start-up of the rotors 11 can develop excess loads. For this reason, shear pins 64, discussed hereinabove, are provided between the retainer ring 23 and seal rotor 21 allowing the rotor 11 and retainer 23 to rotate without torquing the seal rotor 21 until it can be freed from the sleeve 22.

With respect now to FIGS. 5-8, an alternate embodiment of the present invention shall be discussed. A modified seal assembly, indicated generally by the numeral 100, is provided and includes seal rotor means 101, sleeve means 102, pressure balancing element 103 and retainer ring means 104. The design and operation of seal rotor means 101 and retainer ring means 104 are identical to the elements 21 and 23 of seal assembly 20 and, therefore, shall not be discussed here.

Figure 8:
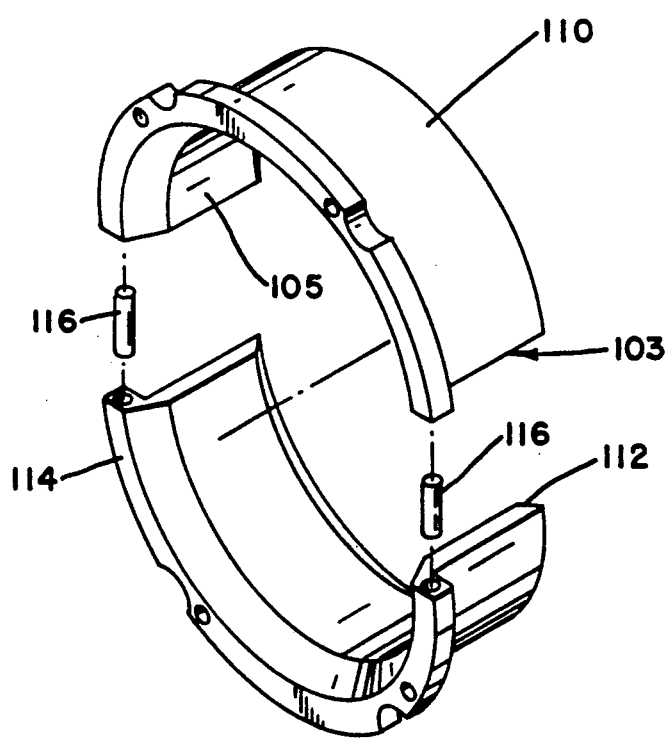
FIG. 8 is an exploded perspective depicting the balancing element of FIG. 5.

The additional element of seal assembly 100 is pressure balancing element 103 which is interposed between seal rotor 101 and sleeve means 102. It comprises a cylindrical sleeve having a radially inner surface 105, contiguous with the lands 106 of inner and outer troughs 108 and 109, and a radially outer surface 110, contiguous with the inner radial wall or sleeve 111 of sleeve means 102. The axial end 112 of element 103 terminates a short distance from the notch 48 of wear plate 49 to define a small cylindrical space 113. At the opposite end of element 103 a radial flange 114 is provided which articulates with suitable means 115 for movement of the balancing element 103 toward and away from the wear plate 49, as depicted in FIGS. 6A and 6B. Means 115 can include a manually operated or power operated mechanism, an example of the former being the threaded shaft depicted in the drawings. Balancing element 103 is also preferably manufactured in halves, as depicted in FIG. 8, which can be suitably joined together via pins 116 or other means.

As should be apparent, movement of the balancing element 103 away from the notch 49 will uncover more of the inner troughs 108 while increasing the volume in the space 113. This, in turn, allows more of the material driven from the cavity 14 to enter the space 113.

The sleeve 102, it will be noted, is similar to sleeve 22, comprising a body portion 118 and a leg 119 extending therefrom. The thickness of leg 119 is decreased approximately to accommodate the presence of balancing element 103. An axial bore 120 extends through the leg 119 and a portion of the body 118 and communicates with a radial port 121 which passes outside of the body. A small bore 122 is provided at the opposite end of axial bore 120 and opens into the space 113.

In operation, axial positioning of the balancing element 103 causes more pumping troughs on one side to be engaged and less on the opposing side. Provision of this element facilitates the control of the pumping direction and amount of leak flow, and it also may be used to compensate for variations in polymers, bulk density and operating conditions.

Regarding the port 121, it is useful for the processing of difficult to melt materials, materials having a high content of inorganic fillers, highly degradable compounds and extremely abrasive additives. These may not readily allow for the formation of a dynamic melt O-ring seal during operation of the mixer and, therefore, a low melt polymer can be injected via port 121 to form the dynamic seal. A similar result could be obtained by injecting a low melt polymer into one of the ports 52 or 54 of the seal assembly 20. The port 121 could also be utilized for cleaning operations involving the injection of molten purge materials.

Figure 9:
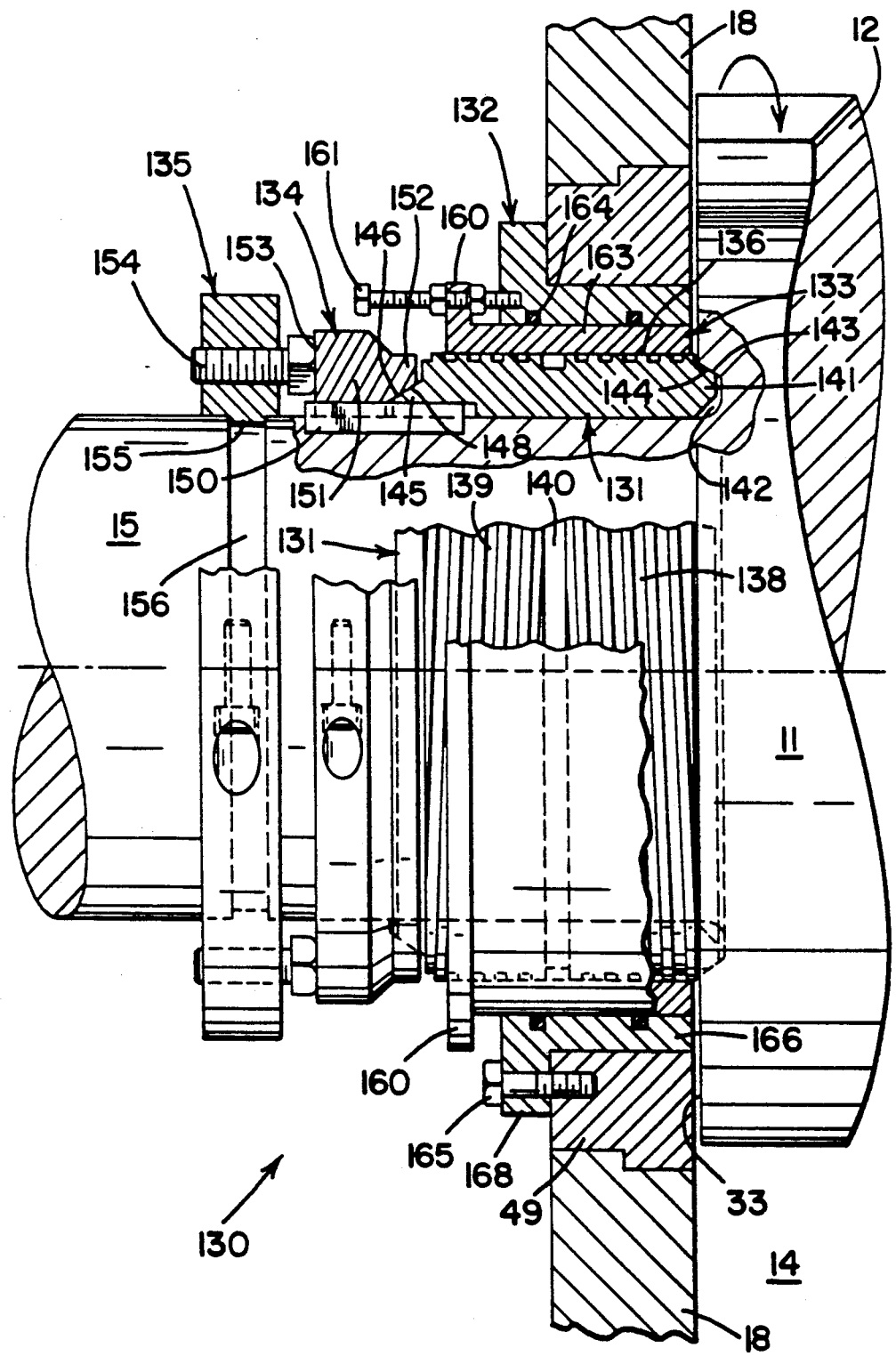
FIG. 9 is a side elevation, partially in section, depicting an alternate embodiment of the present invention.
Figure 10:
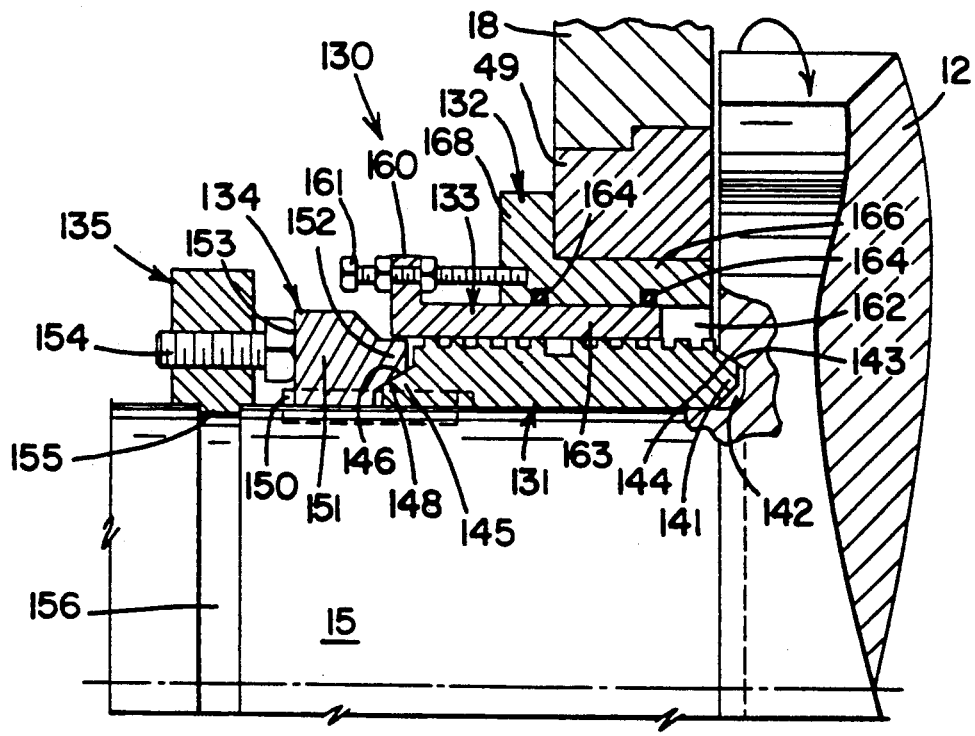
FIG. 10 is a side elevation, partially in section, depicting the seal assembly of FIG. 9, showing movement of the balancing element.
Figure 11:
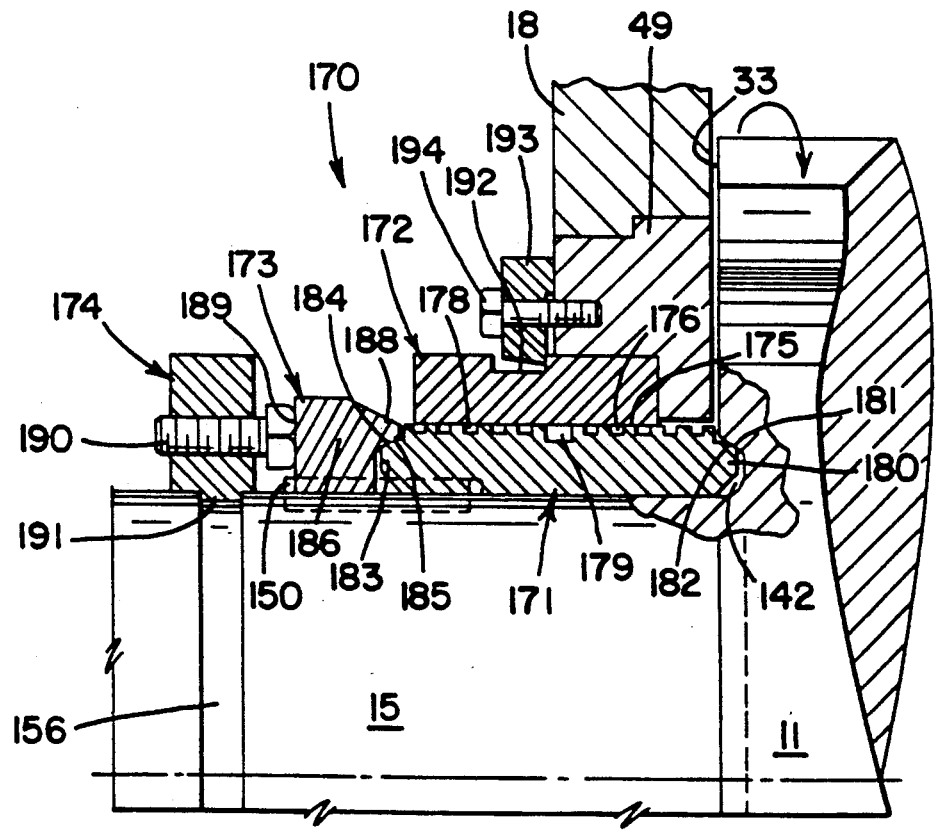
FIG. 11 is a partial side elevation, partially in section, depicting an alternate embodiment of the present invention.

Two final embodiments are depicted in FIGS. 9-11, which shall be discussed next. With references first to FIGS. 9 and 10, another modified seal assembly, indicted generally by the numeral 130, is presented. It is similar to the seal assembly 100 and includes seal rotor means 131, sleeve means 132, pressure balancing element 133, retainer ring means 134 and locking ring means 135.

Seal rotor means 131 is functionally similar to seal rotor means 21 and 101, but provides a modified structure. While it carries a circumferential region 136 providing first and second troughs 138, 139 which meet centrally at an annular groove 140, it also carries a forward lip 141 which is received within an annular recess 142 carried in the shoulder 33 of rotor blades. The recess 142 may be machined into shoulder 33 if it is not already present. Lip 141 and recess 142 provide mating inclined surfaces 143, 144, respectively, which assist with the alignment and placement of seal rotor means 131 about shaft 15. At the opposite end, seal rotor means 131 terminates in a tail flange 145 which provides an inclined or ramped surface 146. Surface 146, in turn, is engageable with a mating inclined surface 148 from retainer ring means 134. Retainer ring means 134 and seal rotor means are provided with aligned keyways for receipt of a key 150 which secures both elements to the shaft 15 for rotation therewith.

Retainer ring 134 is a cylindrical flange having a central body portion 151 (FIG. 10) and an axially extending flange 152 which carries inclined surface 148. The rearward face 153 is engageable with the head of adjustable positioning bolts 154 which are threadably received within locking ring means 135. The latter element is a two piece cylindrical flange which carries an inwardly directed annular foot 155, received within a groove 156, machined into shaft 15. As should be apparent, by adjustment of the bolts 154, the retainer ring 134 urges the seal rotor means 131 into the proper position about shaft 15, with any slack being taken up by the inclined surfaces presented by lip 141 and tail flange 145.

Pressure balancing element 133 and sleeve means 132 are similar to the components 103 and 102 of seal assembly 100. Balancing element 133 is interposed between the seal rotor 131 and sleeve means 132 and carries a radial flange 160 which articulates with suitable means 161 for movement of the element 133 toward and away from (FIG. 10) rotor shoulder 33. Means 161 can include a manually operated or power operated mechanism for changing the volume of space 162 (FIG. 10).

The cylindrical sleeve 163 of balancing element 133 can be sealed within sleeve means 132 via O-rings 164, or the mating surfaces can be threaded, in which instance, the balancing element 133 can be "threaded" in and out of sleeve means 132, as desired. Sleeve means 132 is fastened to wear plate 49 via bolts 165 and is thus stationary with respect to rotation of the shaft and seal rotor 131. While sleeve means 132 does not contain axial and radial passageways communicating between the space 162 and the outside environment, it is within the skill of the art to substitute the sleeve means 102 for sleeve means 132 and vice versa, depending upon the type of seal assembly desired.

Sleeve means 132 comprises a cylindrical body portion 166 and a leg 168, extending radially outwardly therefrom. The body portion 166 provides a cylindrical sleeve contiguous with the outer wall of the pressure balancing means 133. As depicted in the drawings, where means 161 comprises a bolt, it can threadably engage leg 168.

In FIG. 11, another variation of seal assembly is shown, referred to generally by the numeral 170. Assembly 170 is similar to the assembly 130 and includes seal rotor means 171, sleeve means 172, retainer ring means 173 and locking ring means 174, but does not provide a balancing element.

Seal rotor means 171 is similar to seal rotor 131 of assembly 130 and provides a circumferential region 175, providing first and second troughs 176, 178 which meet centrally at an annular groove 179. It also carries a forward lip 180 received within a recess 142 carried in the shoulder 33 of the blades. Lip 180 and recess 142 provide mating inclined surfaces 181, 182, respectively, for alignment and placement of the seal rotor about shaft 15. At the opposite end a tail flange 183 is provided which provides an inclined surface 184 that is engageable with a mating inclined surface 185 from retainer ring means 173. Retainer ring means 173 and seal rotor means 171 are provided with aligned keyways for receipt of a key 150 which secures both elements to the shaft 15 for rotating therewith.

Retainer ring means 173 is a cylindrical flange having a central body portion 186 and an axially extending flange 188 which carries inclined surface 185. The rearward face 189 is engageable with the head of an adjustable positioning bolt 190, threadably received within locking ring means 174. The locking ring means 174 is substantially identical to element 135 of seal assembly 130 and carries an inwardly directed annular foot 191 that is received within groove 156, in shaft 15. By adjustment of bolt 190, the retainer ring means 173 urges the seal rotor 171 into the proper position about shaft 15, as described hereinabove with respect to seal assembly 130.

The sleeve means 172 is generally cylindrical and encompasses the majority of the circumferential region 175 of seal rotor 171, most notably the annular groove 179. On its outer circumference, an annular recess 192 is provided. A plurality of clamps 193 are fastened via bolts 194 to wear plate 49 which fit within recess 192, thereby holding sleeve means 172 in a non-rotatable fashion about seal rotor 171.

As should be apparent from the foregoing description, the seal assemblies 130 and 170 provide a novel manner of location about the shaft 15, with proper positioning of the respective seal rotors being facilitated by adjustment of bolts 154, 190 from elements 135 and 174, respectively. It is also to be understood that a similar seal assembly 130 or 170 would be employed on the other shaft 16 of the mixer 10.

Thus, it should be evident that the seal assemblies of the present invention provide a highly effective means for forming a seal between the rotor shaft and mixing chamber of internal mixers. Wear on the seal is of little consequence because the seal can be formed by a small portion of the mixture that would otherwise be lost from existing mixing apparatus. Moreover, the controlled loss of material, also possible by practice of the present invention, is a sure means of eliminating scorched residues from forming or re-entering the mixing chamber. Finally, the assemblies allow for the injection of separate purge materials as well as low melt materials that can form a seal more readily than the material within the chamber.

Based upon the foregoing disclosure, it should now be apparent that the use of the assemblies described herein will carry out the objects set forth hereinabove. It should also be apparent to those skilled in the art that the seal assemblies of the subject invention can readily be utilized in conjunction with various types of mixing apparatus and that the method of the present invention can be practiced to form a dynamic viscous seal from the material being compounded within the mixer or from a low melt polymer injected separately into the seal assembly.

It is, therefore, to be understood that any variations evident fall within the scope of the claimed invention and thus, the selection of specific component elements can be determined without departing from the spirit of the invention herein disclosed and described. Moreover, the scope of the invention shall include all modifications and variations that may fall within the scope of the attached claims.

I claim:

1. A seal assembly for the rotor shafts of internal mixers comprising:

seal rotor means carried by said rotor shaft outside of the mixing chamber of said mixer and having a continuous circumferential region for the bi-directional movement of a viscous melt of flowable material, said continuous circumferential region providing:
  first trough means extending axially away from said housing;
  second trough means extending axially toward said housing; and
  annular groove means between said first and second trough means;
said seal rotor means providing
  a forward lip engageable with said rotor shaft; and
  a tail flange contiguous with said second trough means;
said rotor shaft carrying blades providing a shoulder adjacent said housing and carrying a recess for receipt of said lip;
sleeve means non-rotatably carried by the housing of said mixer concentrically disposed about said seal rotor means, said sleeve means providing a cylindrical element contiguous with said continuous circumferential region of said seal rotor means and having an annular recess about the outer periphery;
retainer ring means rotatable with said rotor shaft and engageable with said rotor means while providing;
  a body portion;
  an axially extending flange carrying an inclined surface engageable with said tail flange; and
  a rearward face; and,
locking ring means rotatable with said rotor shaft and providing
  an inwardly directed annular foot received within a groove provided in said shaft and
  adjustable means engageable with said rearward face for maintaining said retainer ring means in communication with said seal rotor means;
wherein movement of said flowable material between said continuous circumferential region and said sleeve means forms a dynamic melt seal thereby controlling the discharge of materials from said mixing chamber between the housing and said rotor shaft.

2. A seal assembly, as set forth in claim 1, further comprising:
  clamp means affixable to the housing and engageable with said annular recess for mounting said sleeve means about said seal rotor means.

3. A seal assembly as set forth in claim 1, further comprising
  pressure balancing means interposed between said seal rotor means and said sleeve means.

4. A seal assembly, as set forth in claim 3, wherein said pressure balancing means comprises:
  a cylindrical sleeve movable, axially, between said seal rotor means and said sleeve means; and
  radial flange means at one end of said sleeve.

5. A seal assembly, as set forth in claim 4, wherein said sleeve means provides a body portion and leg extending radially therefrom, said body forming said cylindrical element contiguous with the outer wall of said pressure balance means.

6. A seal assembly, as set forth in claim 5, wherein said pressure balancing means further includes
  means for moving said means axially between said seal rotor means and said sleeve means.

7. A seal assembly, as set forth in claim 6, wherein said means for moving articulates with said radial flange means.

* * * * *